US005919534A

United States Patent [19]

Oxley

[11] Patent Number: 5,919,534

[45] **Date of Patent: *Jul. 6, 1999**

[54] PERFORATED FOOD CASINGS AND METHOD

[75] Inventor: Jeffery Allen Oxley, Naperville, Ill.

[73] Assignee: Viskase Corporation, Chicago, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/757,885

[22] Filed: Nov. 27, 1996

[51] Int. Cl.$^{6}$ .......................... B29D 22/00; B21B 17/02

[52] U.S. Cl. ...................... 428/34.1; 428/34.2; 428/34.8; 72/370.27

[58] Field of Search ................................ 428/34.1, 34.2, 428/34.8; 72/370.27

[56] References Cited

U.S. PATENT DOCUMENTS

| | | | |
|---|---|---|---|
| 5,263,633 | 11/1993 | Bicksler et al. | 229/109 |
| 5,716,658 | 2/1998 | Donnelly et al. | 426/420 |

FOREIGN PATENT DOCUMENTS

| | | |
|---|---|---|
| 2687546 | 8/1993 | France . |
| WO95/04102 | 2/1995 | WIPO . |

*Primary Examiner*—Randy Gulakowski
*Attorney, Agent, or Firm*—Roger Aceto

[57] ABSTRACT

A vented food casing having a plurality of die cut vent openings which are uniform and free-draining so as to provide the casing with a vent rate for air and liquids such as meat juices which is substantially constant around the periphery of the casing. The vent opening being formed by a die cutting operation by drawing flattened casing between rollers, one of which has made punches that mate with female die openings on another roller.

14 Claims, 3 Drawing Sheets

PERFORATED FOOD CASINGS AND METHOD

TECHNICAL FIELD

The present invention relates to perforated food casings and more particularly to a food casing having die cut perforations and to a method of forming the casing.

BACKGROUND OF THE INVENTION

Use of casings in the food processing industry is well known. One segment of this industry uses casings in the production of food products involving whole muscles or large chunks of meat. An example would be smoked ham wherein the whole ham is stuffed into a casing for the smoking operation. Another example is a so called chunk-and-formed product where large meat chunks are combined for stuffing into a casing. For these types of food products, it is desirable that the casing have a plurality of vent openings in order to enhance or facilitate the expulsion of air from the casing as the large meat mass is stuffed into the casing, and to enhance or facilitate the draining of liquids such as water, meat juices and the like formed during or after processing.

A common stuffing method for producing these types of food products involves the use of flattened casing on reels and the stuffing apparatus as described, for example, U.S. Pat. No. 4,696,079. In this apparatus, a measured length of casing is pulled from the reel. The end of the casing is opened and a meat mass is rammed into the open casing. The open end is gathered and clipped to close it. Then the casing on the opposite side of the meat mass is gathered and the casing is pulled back from the clip closure so the casing wall is drawn up tightly around the meat mass thereby expelling entrapped air from between the casing and the meat mass. A second clip is applied to close a second end of the casing and then the casing is cut to separate the encased food product from the reel.

The speed and force of drawing the casing tight about the meat mass necessitates a perforated casing to facilitate the venting of air and excess liquids which may be squeezed from the meat mass as the casing tightens around it. Thereafter, during processing such as by cooking or smoking, additional gases and juices are released which are vented and drained from the casing through the perforations.

The most common method of providing the casing with vent holes is to flatten the casing and then prick through both plies of the flattened casing with sharp, pointed needles. If the casing is pricked from above, the perforations created will have inwardly disposed flaps in the upper ply of casing and outwardly disposed flaps in the bottom ply of the casing. The use of pointed needles also makes the vent flaps in the upper ply slightly larger than those in the bottom ply and all perforations may have somewhat jagged edges.

Due to the non-uniform configuration and size of the vent openings in the upper and lower plies, the venting of air, water and meat juices is not uniform about the circumference of the casing. The non-uniform venting also is the result of the closing of the inwardly disposed flaps during stuffing. This is because the pressure and meat mass tend to force these flaps outward so as to close off the vent openings. On the other side of the casing, the internal casing pressure forces the outwardly disposed flaps to remain open.

A further drawback of this casing is that the flaps produced by needle piercing are somewhat jagged and these jagged edges provide points of stress concentration where tearing can initiate when the casing is drawn tight about the meat mass. It also is possible for moving elements of the stuffing apparatus to snag on these flaps and initiate a tear or other casing failure.

Various efforts have been made to improve perforated casing. For example, U.S. Pat. No. 3,779,285 discloses use of a flat faced punch to make the vent opening. The punch is on a roller which interfaces with a backup roll having a resilient surface. As the punch presses the casing into the resilient surface, it tears a slug of casing from the upper and lower plies of casing and deposits them in the resilient surface of the backup roll. Since the backup surface is resilient, the lower ply still exhibited an outwardly flared edge caused by the passage of the punch. These flared edges still provide snag points and areas of stress concentration where tears can initiate. Moreover, venting still is not uniform around the casing perimeter and the backup roll has a relatively short life due to the constant contact with the punches.

Other attempts have been made to provide an improved perforated casing by using knife points. However, slits produced with knife points are not entirely satisfactory.

One drawback with prior art methods using pin or knife points to form the vents, or using punches against a resilient backup roll to knock slugs from the casing is that care had to be taken to avoid damaging the folded edge of the laid flat casing. This is because a sharp pin, knife point or punch which nicked the casing edge tended to produce a more ragged perforation in this area so the casing was more susceptible to tearing when drawn up tight against the meat mass. For this reason, care was taken to insure that the perforating apparatus did not operate out to or beyond the folded edge of the laid flat casing. This required a change in the set up of the apparatus for each different flat width of casing.

Accordingly, there is a need for perforated casing having improved venting properties and for methods and apparatus for making such a casing.

OBJECTS OF THE INVENTION

One object of the present invention is to provide a tubular food casing having vent openings substantially free of inwardly and outwardly disposed flaps.

Another object of the present invention is to provide a food casing having a vent rate of air and liquids which is uniform around the casing perimeter.

A further object of the present invention is to provide a vented food casing wherein the vent openings are formed by die cutting such that the edges defining the openings are substantially clean cut and are flush with the casing wall.

Yet another object is to provide a method for obtaining a perforated casing having vent openings which are uniform and clean cut and which have no inwardly or outwardly disposed flaps or lips or the like.

SUMMARY OF THE INVENTION

In accordance with the present invention, a casing article is provided for use in stuffing whole muscle meat and chunk-and-formed meat products having enhanced venting of air and liquids such as water, meat juices and the like. The enhanced venting results from die cut vent openings wherein the die cutting physically removes casing material to provide a substantially clean cut edge which is flush with the wall of the casing. Moreover, the vent openings are die cut with the casing in a laid-flat condition so openings on both sides of the casing are in registration, are of equal area and have edges which align. All of these features contribute to provide a vent rate through diametrically opposite areas of the casing which is substantially constant.

The die cut method according to the present invention utilizes both male and female die cutting members so the openings have a relatively smooth clean edge free of stress concentration points. Consequently, there is no danger of weakening the casing by providing vent openings even at the casing edge. This simplifies production in that no special adjustment need be made when perforating casings of different flat widths. The die cutting members are in the form of rollers with punches on a first roller and die openings on a second roller. Except for the meshing of the punches and die openings, the rollers are not geared together or motor driven. Instead, the drawing of the casing between the rollers and against the punches drives the first roller and the meshing of the punches with the die openings drives the second roller.

It is important for the rotation of the two rollers to be synchronized so that each punch mates with only one given die opening. To accomplish this, the punches and the associated die openings are staggered about the roller peripheries so that at a given increment of rotation there is at least one punch fully inserted in its counterpart die opening and several more punches which are at different stages of insertion and retreat. In this fashion, the second roller is continuously driven in synchronism with the first roller by the progressive insertion of punches into their counterpart die openings and subsequent retreat of the punches from the die openings.

The die cutting operation removes a slug of casing to form a clean-cut opening having a smooth edge which is generally flush with the casing wall. That is, there are little or no portions of the casing such as a lip, flap or shred about the openings which extend outward or inward with respect to the plane of the casing wall.

The slugs of casing or “chad” are forced progressively down the die opening and into the interior of the second roller which is hollow. The chad is then removed from the hollow interior by any suitable means such as by a vacuum line communicating with the hollow interior.

DETAILED DESCRIPTION OF THE INVENTION

Figure 1:
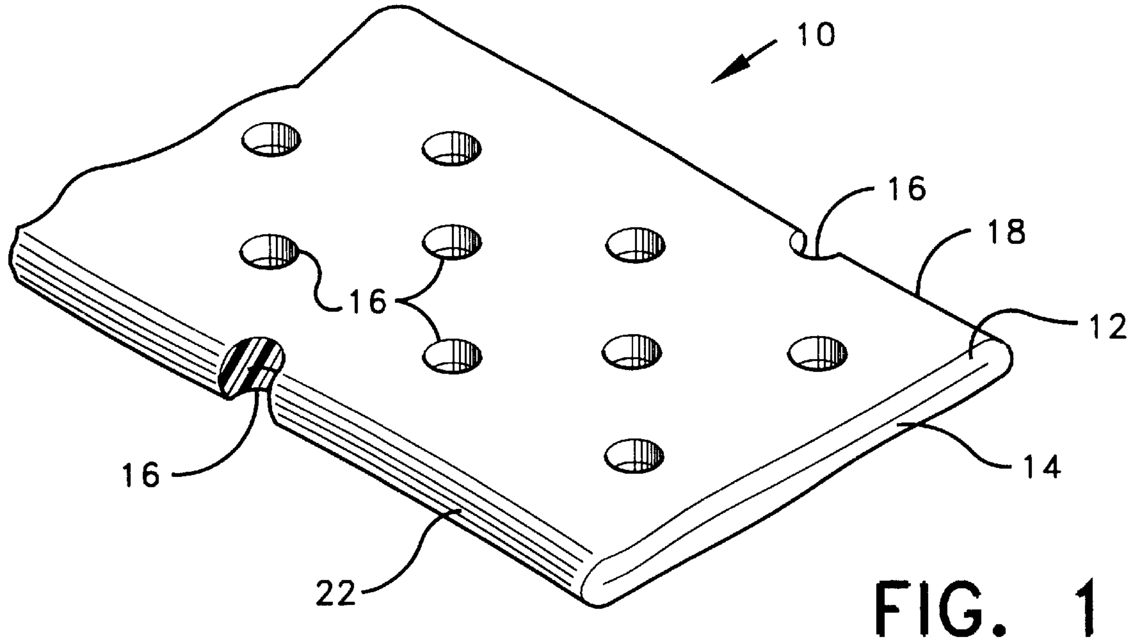
FIG. 1 is perspective view showing the casing of the present invention laid flat.

Referring to the drawings, FIG. 1 shows the casing of the present invention generally indicated at 10. The casing is tubular but is shown flattened in FIG. 1 so that two plies 12 and 14 of the casing are laid flat one against the other. The plies each represent one-half of the casing perimeter so the flat width of the casing is one-half its circumference. The casing preferably is of regenerated cellulose but it could be of any other well known food casing material such as a plastic casing, for example, nylon or a multilayer film. Most preferably, the casing is a fibrous casing which is a regenerated cellulose casing having a reinforcing web of a nonwoven paper. Fibrous casings are well known in the art.

The casing is perforated by a plurality of die-cut vent openings 16. These openings preferably are circular or oval so there are no stress concentration points as would be produced by sharp corners of square or rectangular openings. Die cut openings are produced by removing plugs or slugs of the casing material to provide openings 16. These openings 16 may vary in size from 0.015 to 0.040 inches (0.38 to 1.02 mm) in diameter and extend over the surface of the laid flat casing in a predetermined defined pattern. As shown in FIG. 1, it is possible for the die cut operation, as described further hereinbelow, to cut openings 16 out to and including the edges 18, 22 of the laid flat casing.

The die cut openings 16 have relatively clean edges in that they are free of flaps, flanges or the like which extend inward or outward from the casing surfaces. This is best seen in FIG. 2.

Figure 2:
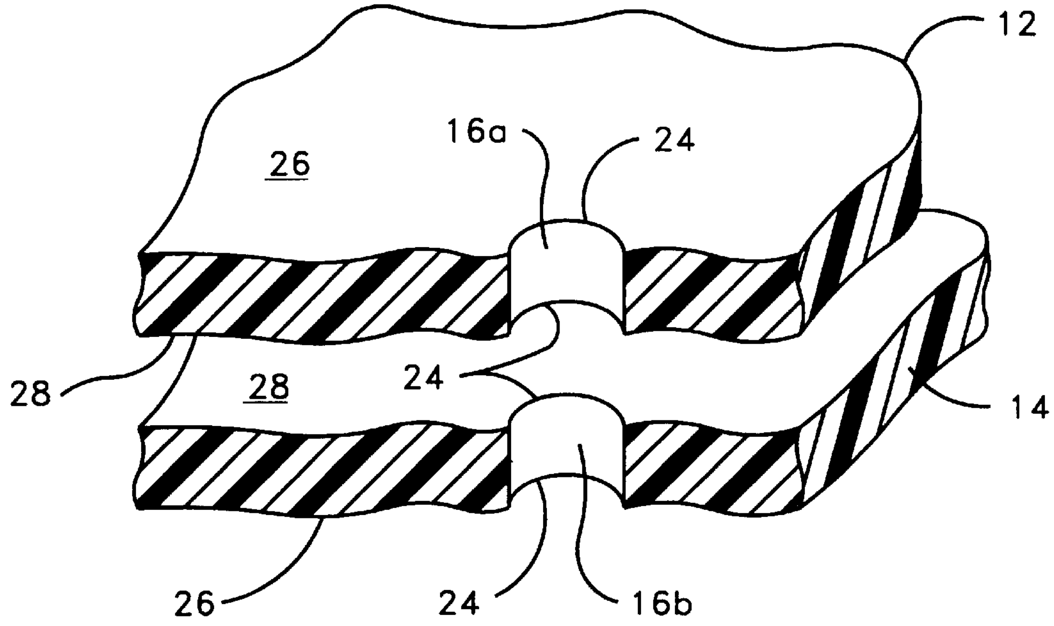
FIG. 2 is an enlarged view of a portion of the FIG. 1 casing partly broken away and in sections.

As shown in FIG. 2, the laid flat plies of casing 12, 14 of FIG. 1 are shown separated for purposes of illustration. The die cut vent openings 16 (*a*) in upper ply 12 and the openings 16 (*b*) in lower ply 14 each have relatively clean cut edges 24. Further, the edges of the openings are substantially flush with the plane of the casing and there is no portion of the casing wall about the openings which extends outward from the outer surface 26 of the casing wall or inward from the inner surface 28 of the casing wall.

Moreover, since both the openings 16 (*a*), 16 (*b*) are formed by a single combination of male and female die cut members, as set out hereinbelow, there is a registration of the openings including an alignment of the edges 24 and they have substantially the same open area. It should be appreciated that given the small size of the die cut openings 16 and the nature of the cellulosic material of the casing, some fraying of the edges can occur depending upon various manufacturing parameters and as the punches and dies wear through use.

Figure 3:
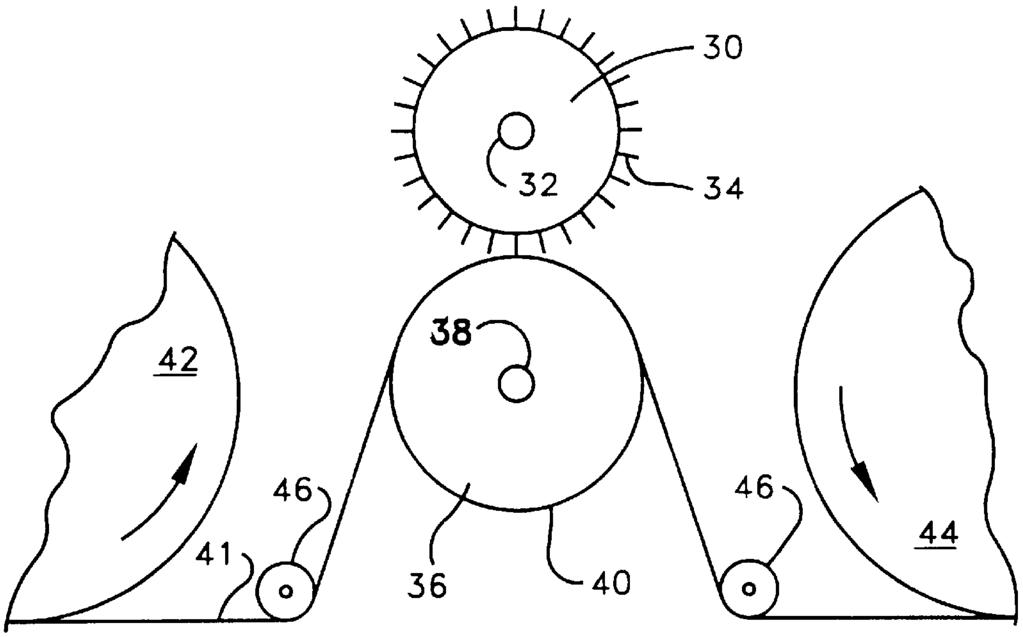
FIG. 3 is a schematic view illustrating apparatus and a method for making the casing of the present invention.

The apparatus for die cutting the vent openings is shown in FIG. 3. The apparatus includes a roller 30 which is mounted for rotation about an axis 32. Roller 30 has a plurality of punches 34 extending from its surface. The roller and punches comprise the male member of a die cutting set. The second member of the set also is a roller 36, mounted for rotation about an axis 38 which is parallel to axis 32. The roller 36 is provided with a plurality of die cut openings (not shown) arranged for receiving the punches 34. Roller 36 and its die openings comprise the female member of the die set. As further set out hereinbelow, the arrangement of the punch and die openings is such that each punch 34 mates with only one given die cut opening.

The surface 40 of roller 36 is rigid and the two rollers are spaced apart so the space between them is greater than the thickness of the flattened casing.

The flattened casing which passes between the two rollers 30, 36 is die cut by the operation of punches 34 on roller 30 mating with the die openings on roller 36. In this respect, an unpunctured laid flat casing 41 is drawn from a supply reel 42 and between the two rollers 30, 36. The casing is perforated as it passes between the rollers and the casing, now perforated, is taken up by a rewind reel 44. Idler rolls 46 are optionally disposed to press and partly wrap the casing around female roller 36. With this arrangement, the female roller 36 is driven by the casing as the casing is pulled through the space between the rollers.

Preferably, the rewind reel 44 is driven for pulling the casing from the supply, or unwind, reel 42 and drawing the casing between the set of die cut rollers 30, 36. The two rollers 30, 36 are not themselves driven by an independent drive. Also, gears for interconnecting the two rollers 30, 36 and driving them in synchronism are optional. The driving of both the die cut rollers preferably is accomplished simply by advancing the casing between the rollers.

Figure 4:
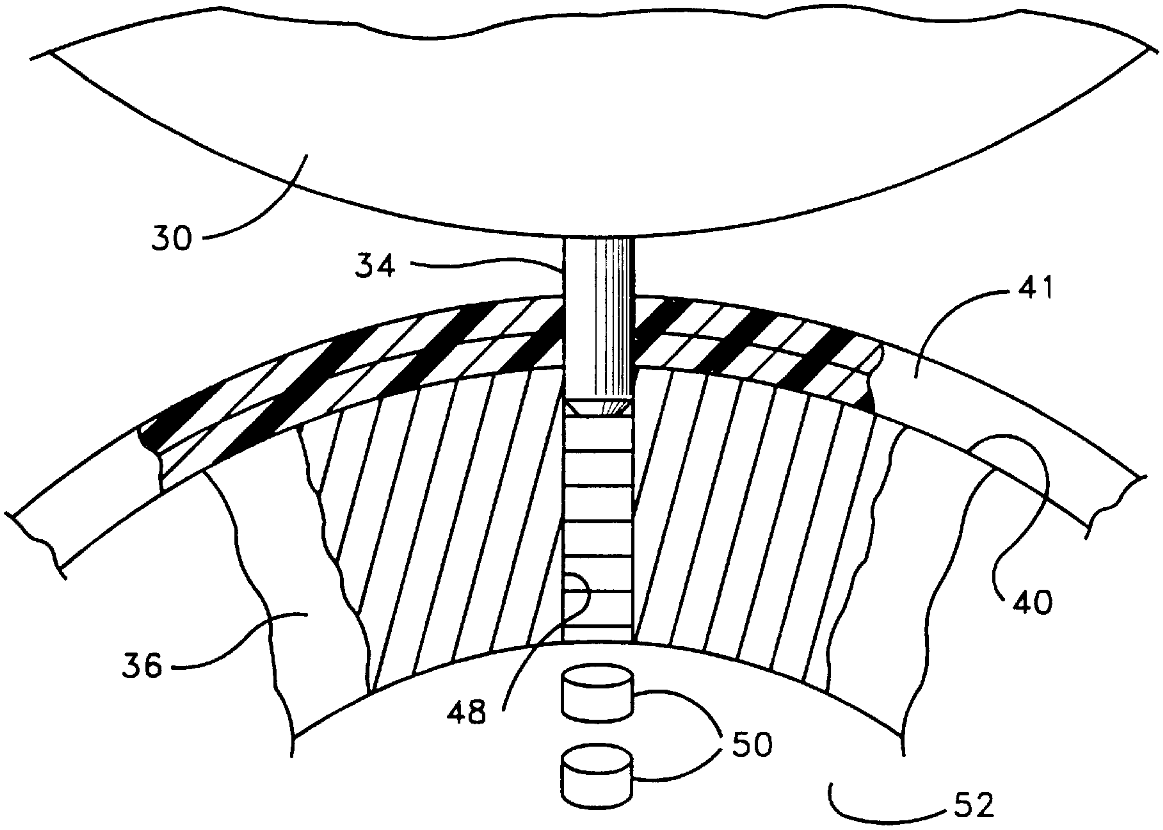
FIG. 4 is a schematic view on an enlarged scale showing a portion of the apparatus for die cutting the casing and practicing the method of the present invention.

For example, if the casing is drawn straight through the gap between the rollers, the casing first engages punches 34 and this causes the rotation of the first male roller 30 about its axis 32. As the roller 30 turns, the punches 34 first press plies of casing against the rigid surface of the female roller 36 and then drive through the casing and into its mating die opening 48 as shown in FIG. 4. The mating or meshing of the punches 34 and die openings 48 serve as the drive for rotating the female roller 36.

In a preferred embodiment, as shown in FIG. 3, where the casing is partly wrapped around the second roller 36, advancing the casing will drive the second roller. This in turn causes the rotation of the first roller.

In any event, as each punch mates with its associated die cut opening 48 in roller 36, a slug or plug 50 is die cut from both plies of casing. The female roller 36 has a hollow interior. Accordingly, as shown in FIG. 4, the plugs 50 of casing, otherwise known as "chad", work down the die opening 48 and into the hollow interior 52 of the female die member. From here the chad is removed by any suitable means, such as a vacuum line (not shown) connected to the hollow interior of roller 36.

The punches 34 and die openings 48 are arranged so there is a progressive engagement of punches into their associated die openings and this keeps the rollers moving in synchronism. This is illustrated in FIG. 5.

Figure 5:
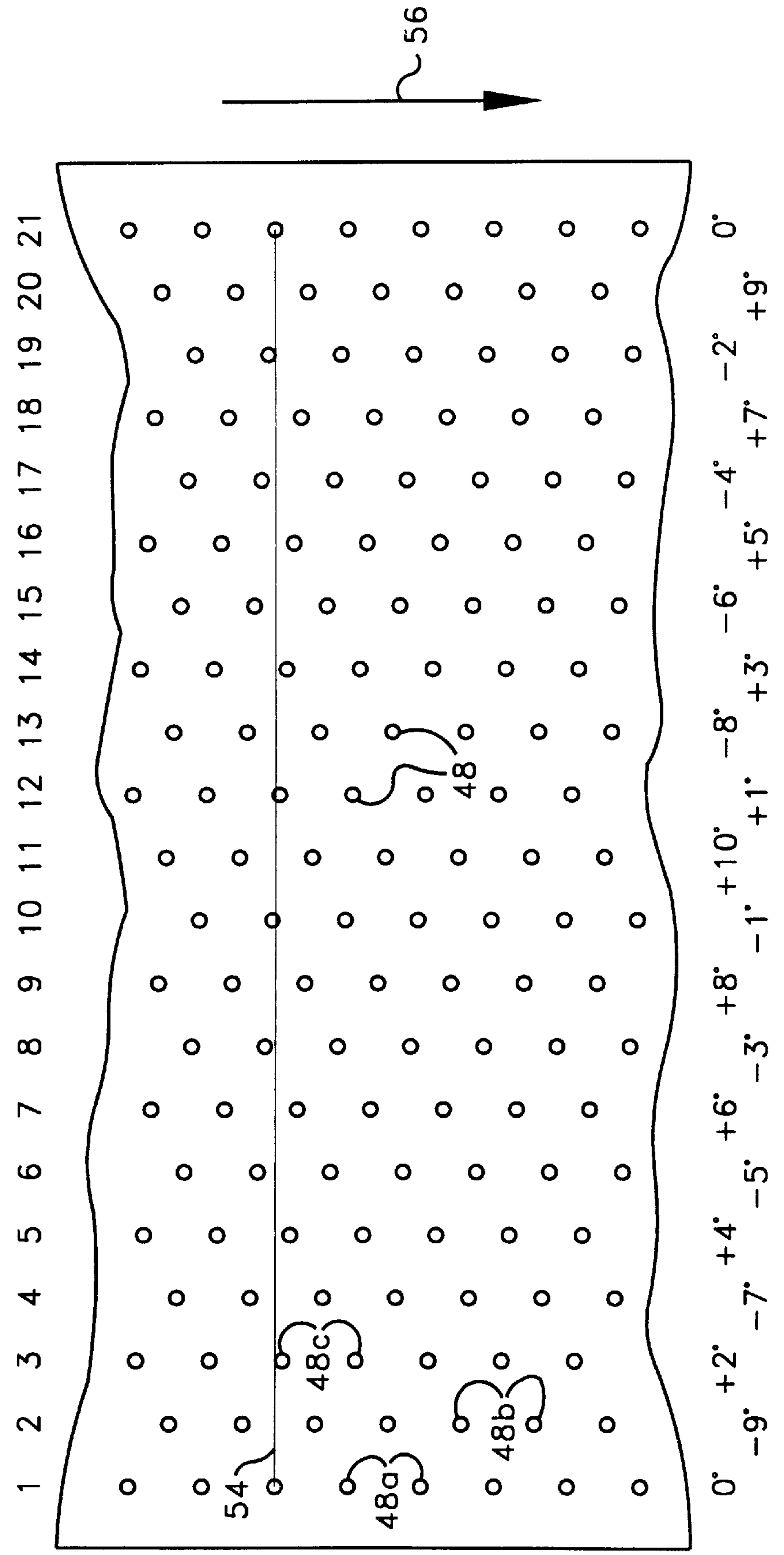
FIG. 5 is a schematic view illustrating the progression of die openings along the surface of the die cutting apparatus.

FIG. 5 shows a portion of the surface of the second roller 36 with the direction of rotation indicated by arrow 56.

As seen in FIG. 5, the die openings 48 (and therefore the associated punches on roller 30) are arranged in columns which are equally spaced across the width of the second roller. Each column (numbers 1–21) contains the same number of die openings equally spaced about the periphery of the second roller. Further, the die openings 48*b* (and their associated punches) in the second column (2) are offset from the die opening 48*a* in the first column. The offset can be either leading or trailing in the direction of rotation as indicated by arrow 56. If the offset leads in the direction of rotation, the amount of the offset is slightly more than one-half the arc length between the equally spaced die openings. If the offset trails or lags in the direction of rotation the amount of offset is slightly less than the arc length between the equally spaced die openings. The openings 48*c* (and their associated punches) in the third column (3) are offset a like amount from the die openings 48*b* in the second column. The offset of the die opening in one column from those in an adjacent column continues across the roller for each successive column of die openings. With this arrangement, the offset from one column to the next is n/2 plus or minus a small increment of arc (say 1°) where "n" is the number of degrees between the die openings in a column.

Offsetting one column of die openings from another slightly more or less than one-half the arc length between die openings, is important to the synchrononous driving of the rollers. For example, if the offset was simply 1° of arc, then the progression of punches into full engagement with their respective die openings would progress straight across the width of the rollers from column 1 to column 21. However, with the offset being n/2+1° or n/2−1° the progressive engagement of punches into the die openings across the width of the rollers is scattered between the columns and this results in a smoother meshing and synchronous driving of the rollers. For example, given a distribution of die openings as shown in FIG. 5, an offset of n/2+1° and a spacing between die openings of 20°, then the line 54 represents an instant in the rotation of the rollers where only the punches corresponding to the openings 48 in columns 1 and 21 would be centered and fully engaged with these die openings. However, scattered along line 54 are punches in various stages of advancement into the die openings and others in various stages of retreat from the die openings relative to the time at line 54. In particular, and as shown in FIG. 5, punches associated with die openings in columns 12, 3, 14, 5, 16, 7, 18, 9, 20, and 11 would be respectively 1°, 2°, 3°, 4°, 5°, 6°, 7°, 8°, 9° and 10° of arc past full engagement and in retreat from the die openings. On the other hand, punches associated with die openings in columns 10, 19, 8, 17, 6, 15, 4, 13 and 2 would be respectively 1°, 2°, 3°, 4°, 5°, 6°, 7°, 8° and 9° of arc away from full engagement with their associated die openings.

Thus, not all the punches across the roller are fully engaged with a corresponding die opening at any given instant of rotation. The arrangement as shown, provides a continuous progression around the rollers so that each degree of rotation brings at least one punch into full engagement with its associated die opening and there is a continuous driving of the second roller 36 by the first roller 30. However, the action of punches entering and leaving their mating die openings is not in a progression from column to column straight across the width of the rollers. Instead the progression of punches which are fully inserted into a die opening alternates back and forth from one column to another across the width of the roller. For example, in the FIG. 5 embodiment, the progression of punches from time line 54 which are fully inserted into a die opening would be in the following column order: 10, 19, 8, 17, 6, 15, 4, 13, 2, 11, 20, 9, 18, 7, 16, 5, 14, 3, 12 and then 1 and 21 simultaneously. Accordingly, the location of a punch which is fully inserted into a die opening moves back and forth between columns which are not adjacent so the progression is not linear across the rollers. It is this arrangement which maintains a synchronous rotation of the two rollers 30 and 36. While no gears are needed for this synchronous rotation, it is important that the rollers be secured in a suitable frame (not shown) which maintains the axis of rotation of each member parallel and at a fixed distance apart. Means for such securing are well within the skill of the art.

To demonstrate the present invention, rollers 30 and 36 were made. The female roller 36 had a diameter of about 3.25 inches (8.25 cm) and was 12.5 inches (31.75 cm) long. The roller was hollow and its surface 40 was a hardened steel. The roller was provided with 378 of the die cutting openings 48 arranged in 21 columns with 18 openings in each column. The columns were about one-half inch (12.7 mm) apart and the die openings in each column were spaced about 20° apart. As noted above, the openings in one column were offset about 11° (or n/2+1°) from the openings in an adjacent column. The die openings were each about 0.028 (0.71 mm) inch in diameter and each opening communicated with the hollow interior of the roller.

Male roller 30 was provided with 378 punches similarly arranged. The punches projected about 0.120 inches (3.05 mm) from the surface of the roller and the effective diameter of the roller, including punch length, was about equal to the diameter of the female roller 36.

The punches were of a softer steel than the surface of roller 36 and had a hardness of about 25–30 Rc. The punches were formed with a diameter slightly larger than the diameter of the die openings. During the maiden engagement, the punches were sheared upon entering the die openings and in this way each punch was sized to fit closely into its associated die opening.

For operation, the rollers were set about 0.115 inches (2.92 mm) apart so that the depth of punch penetration into the die openings was about 0.005 inches (0.13 mm). It should be appreciated that the number of punches and penetration depth as noted above, clearly can vary depending upon the selected diameter of the roller and the desired number and length of the punches.

The frame holding the rollers must be sufficient to maintain an alignment of the two rollers to insure a proper mating of each pin and its associated die opening. As noted above, it is this alignment together with the progressive entry and removal of punches into the die openings which drives the female roller 36 and keeps the two rollers rotating in synchronism.

A Viskase Corporation size 11 fibrous casing (8.25 inches or 20.95 cm flatwidth) was run through the die punch apparatus at a speed of about 200 feet/min (60.96 m/min). No special care was taken to position the flat stock to insure that the casing edges were outside of the die cut area. Accordingly, the perforated casing did exhibit die cut openings at intervals along the casing edge.

The die cut casing contained die cut vent openings arranged in a hexagonal pattern which mirrored the array shown in FIG. 5, the openings in the machine direction (columns) being about 0.56 inch (14.22 mm) apart and in the transverse direction (rows) being about one-half inch (12.2 mm) apart. This produced about 3.5 openings per square inch and on inspection it was determined that over 95% of the die cut openings were free of casing material.

A test was devised to determine the vent rate of the casing. In this respect one end of the casing is gathered and closed. The casing is oriented vertically with its closed end down and open end up. Water is poured into the casing. The rate of the inflow is controlled to just keep the casing filled while avoiding an overflow from the open top. In this fashion, the rate of inflow balances and is equal to the vent rate through the casing wall. With the casing formed as noted above, it was determined that the vent rate of a casing section about 12 inches (30.48 cm) long was 10.8 gals (40.8 liters) per minute. In contrast, a similar size fibrous casing made in the conventional manner using 0.060 in. (1.52 mm) diameter presticking pins arranged in essentially the same pattern had a vent rate of only 6.4 gal/min (24.21 liters). Thus, the inventive casing, with die cut openings of only 0.028 inches (0.71 mm) in diameter had a greater vent rate than the same size casing prestuck with needles of more than twice the diameter.

The draining of the water from about the casing parameter was observed. It was evident that for the inventive casing, the flow rate appeared uniform from around the casing. However, for the prestuck casing formed using presticking pins, it was evident that there was a greater flow from one side of the casing than from the other. Thus, the vent rate of the casing of the present invention was both greater than that of the casing stuck with a larger diameter pin and more uniform around the casing. These features are highly desirable.

The higher vent rate allows the rapid venting of air during stuffing. This permits a faster operation and decreases the likelihood of bursting the casing as it is drawn up tight about the food product. The smaller openings and uniformity of venting contributes to the appearance of the food product as further noted below.

The casings were stuffed and processed to produce a chunk-and-form ham product. The stuffed samples were visually inspected after processing. Product formed in the casing of the present invention had a uniform distribution of "nubs" on the product surface. These nubs are formed by meat juices which exude through the vent openings and coagulate under processing conditions. In contrast, the conventionally prestuck casing was less uniform in appearance because the nubs at one side of the stuffed casing were more prominent than those at the opposite side of the casing.

Thus, it should be appreciated that the present invention provides a perforated casing having improved venting properties. The improved venting, as provided by the die cut openings, increases the rate of venting over larger vent openings made by needle presticking and provides for a more uniform venting about the casing periphery for enhancement of product appearance.

Having described the invention in detail what is claimed as new is:

1. A perforated food casing having enhanced venting properties for use in the stuffing of whole muscle meat products and chunk-and-formed meat products in which the stuffing and processing operations utilizing the casing causes venting of air and liquids such as meat juices out through openings in the casing, said casing comprising:

a) a tubular casing wall composed of a regenerated cellulose having a reinforcing web of a non woven paper, said tubular casing wall having a plurality of die-cut openings formed by a complete removal of casing material from said wall, the portion of said wall defining the edge of each said openings being clean cut and flush with the casing wall such that said wall is free of casing material extending either inwardly or outwardly with respect to said casing wall from about the edge of said openings;

b) said casing, when in a lay-flat condition wherein one casing wall portion defining a first half of the casing perimeter is laid flat against an opposite wall portion defining a second half of the casing perimeter, being characterized by having all of said openings in said one wall portion in registration with all of said openings in said opposite wall portion and said registration including an alignment of the edges defining said openings; and c) said casing having a vent rate of air and liquids through said casing wall which is constant about the perimeter of said casing such that said vent rate through diametrically opposite areas of said casing is substantially constant.

2. A food casing as in claim 1 wherein said casing has 3.5 die cut openings per square inch of casing, each of said openings being about 0.028 in. diameter.

3. A method for forming a perforated tubular food casing having enhanced venting properties for use in the stuffing of whole muscle and chunk-and-formed food products in which the stuffing and processing operations cause venting of air and liquids such as meat juices out through openings in the casing wall, said method comprising the steps of:

a) providing a pair of rollers including a first roller having a rigid surface, a hollow interior and a plurality of female die openings in its rigid surface, said openings each communicating with the hollow interior, and a second roller having a rigid surface and a plurality of corresponding die punches extending from its rigid surface which mate with said die openings, the rigid surfaces of said rollers defining a space therebetween and each punch on said second roller being associated with a given one of said female die openings, such that a given punch mates only with one given female die opening;

b) arranging said punches and die openings such that there is a progressive meshing of punches and die opening and at a given increment of rotation, there is at least one punch in full engagement with its associated die opening and there are other of said punches which lead and lag said at least one punch and which are in partial engagement with their associated die openings;

c) advancing a flattened tubular casing having upper and lower plies into the space between the rollers;

d) drawing the flattened tubular casing through the space between the rollers for driving one of said rollers and the rotation of said one roller causing the rotation of the other of said rollers and the driving of the punches through both plies of the flattened casing and into the die openings whereby the progressive meshing of punches on the second roller with die openings on the first roller causes the synchronous rotation of said rollers;

e) cutting a slug of casing from each ply by the entry of each punch into its associated die opening on each rotation of said rollers to form clean cut holes in both plies which are in registration such that the edges of said holes in the two plies are aligned and such that said holes are free of outwardly and inwardly extending casing portions around the edges of the die cut holes; and f) advancing slugs of casing through said die openings by the successive cutting of slugs on each rotation of said rollers thereby forcing the slugs of casing through the die openings and into the hollow interior of the first roller whereby (i) the drawing of the casing through the space between the rollers provides the means for driving the rollers and (ii) the punches entering their associated die openings provides the means for synchronous rotation of said rollers and (iii) the removal of casing to form clean cut vent openings in both plies provides the casing with vent properties that are uniform around the casing circumference.

4. A method as in claim 3 wherein said punches and die openings are between 0.015 and 0.040 inches in diameter.

5. A method as in claim 3 including arranging said die openings in columns spaced across the length of said first roller, the die openings in each column being equally spaced about the circumference of said first roller and the die openings in one of said columns being offset in the direction of rotation from the die openings in an adjacent one of said columns by an arc length and the arc length of the offset being sufficient to insure that when any given punch is fully inserted into its associated die opening, punches in advance of said given punch and punches which lag said given punch in the direction of rotation are just exiting or just entering respectively their associated die openings so as to provide said progressive meshing of punches and die opening and the synchronous rotation of said roller.

6. A method as in claim 5 wherein the amount of said offset is the same for each column of die openings and is an arc length other than one half the arc length between the equally spaced die openings.

7. A method as in claim 5 wherein the location of a punch which is fully inserted into its die opening moves back and forth between spaced apart, nonadjacent columns such that the progression of fully inserted punches across the width of said rollers is nonlinear.

8. A method as in claim 5 wherein the offset of the die openings in one column from the die openings in a next adjacent column is an arc length of $n/2+1°$ or $n/2-1°$ where "n" is the degrees of arc between the die openings in a column.

9. A method as in claim 8 wherein n=20°.

10. A method as in claim 7 wherein at any given instant of rotation, when there is at least one punch and die opening pair fully engaged, there also are three punch and die openings all within 3° of arc of entering full engagement and three punch and die opening pairs all within 3° of arc past full engagement.

11. A method as in claim 3 comprising passing said flattened casing around idler rollers arranged to draw the flattened casing down against the rigid surface of said first roller.

12. A method as in claim 3 comprising wrapping the casing partly around the surface of the first roller whereby drawing the casing through said space drives the first roller.

13. A method as in claim 4 comprising driving the second roller by the progressive meshing of the punches on its surface with the die openings on the first roller.

14. A perforated food casing comprising:

a) a tubular wall composed of a regenerated cellulose having a reinforcing web of a non woven paper;

b) said wall having a plurality of die cut vent openings each not more than about 0.028 inches in diameter, the edges defining said vent openings being clean cut;

c) said casing, when it is in a laid flat condition, having the vent openings at one side of the casing in registration with the vent openings at an opposite side of the casing including an alignment of the clean cut edges defining said openings;

d) said casing, in an inflated condition, having a vent rate of air and liquids through said vent openings which is uniform and substantially constant at diametrically opposite areas of said casing; and e) said vent openings being formed by flattening the casing to juxtapose upper and lower plies and then advancing the flattened casing between a mating pair of punch and die rollers, the die roller having a rigid surface provided with a plurality of die openings and the punch roller carrying a plurality of rigid punches arranged so that each of said punches mate with only one corresponding die opening for cutting slugs of casing from each of said plies to form said vent openings with said clean cut edges.

* * * * *